UNITED STATES PATENT OFFICE.

JAMES C. BURDETTE, OF CHICAGO, ILLINOIS, ASSIGNOR TO DRYDEN RUBBER COMPANY, OF CHICAGO, ILLINOIS, A CORPORATION OF ILLINOIS.

MATERIAL USED IN RUBBER MANUFACTURE AND PROCESS OF MANUFACTURE.

1,363,229.   Specification of Letters Patent.   Patented Dec. 28, 1920.

No Drawing.   Application filed October 26, 1918. Serial No. 259,784.

*To all whom it may concern:*

Be it known that I, JAMES C. BURDETTE, a citizen of the United States, and a resident of the city of Chicago, in the county of Cook and State of Illinois, have invented certain new and useful Improvements in a Material Used in Rubber Manufacture and Processes of Manufacture; and I do hereby declare that the following is a full, clear, and exact description of the same.

This invention relates to the formation of a flexible material or rubber compound adapted to be used for making heels, soles and other similar manufactured rubber products. Heretofore, gilsonite, which is a fine grade of asphaltum, has been used for various purposes, but has not been used in combination with ground vulcanized rubber, water and other chemicals to produce a mixture which, when subjected to the action of heat, preferably derived from steam under pressure, will produce a tough flexible material adapted to take the place of leather and rubber products.

It is an object of this invention to produce a tough flexible material used in rubber manufacture by mixing gilsonite or other similar bituminous materials with ground vulcanized rubber and water in certain proportions and subjecting the mixture to heat, preferably derived from steam under pressure.

It is an important object of this invention to produce a material adapted to be used in place of leather and rubber compounds, by mixing gilsonite or a similar bituminous material, ground vulcanized rubber, and other materials with water and subjecting the mixture to heat to form a homogeneous mass.

To produce the product of this invention, substantially equal parts of gilsonite or similar bituminous materials and ground vulcanized rubber are thoroughly mixed mechanically. The first mixture thus produced is then thoroughly saturated with an amount of water equal in weight to about half that of the first mixture to form a second mixture, which is put into an autoclave or devulcanizer and subjected to the action of sufficient heat, preferably derived from steam at about sixty five pounds pressure, for a period of approximately two hours to produce a homogeneous mass adapted to be milled into stock form for use, which is taken from the autoclave and dried by any suitable means, forming a mass or product suitable for use as an ingredient in rubber compounding. The time of treatment and the steam pressure are, of course, variable, depending upon the condition of the gilsonite and vulcanized rubber used.

To form a commercial material adapted to be used in place of leather and rubber compounds, the dried compounding product or mass is again placed in the mixing mill and mixed to a homogeneous mass with suitable quantities of virgin rubber, sulfur, magnesium oxid, red oxid of iron, disintegrated cotton fabric impregnated with unvulcanized rubber, and petrolatum, and heated to afford a tough flexible material adapted to be used in the same way that any ordinary rubber compound would be used. Only sufficient heat is applied in the second treatment to form a homogeneous mass adapted to be milled into stock form for use. To form a desired product, the substances named or similar ones may be used in the following quantities: 76% of the compounding mass; 6% of virgin rubber; 4% of sulfur; 1% of magnesium oxid; 7% of red oxid of iron; 4% of disintegrated cotton fabric impregnated with unvulcanized rubber; 2% of petrolatum.

The above process of forming the product of this invention is not necessarily a continuous one. The gilsonite or other similar bituminous material and ground vulcanized rubber may be mixed in substantially equal proportions by weight in the mixing mill and stored in any desired quantities, from which portions may be taken as desired and mixed with a quantity of water equal in weight to approximately fifty per cent. of the total weight of the mixture of gilsonite and ground vulcanized rubber. The saturated mixture is then put in the autoclave to form the previously described compounding mass or product. It will also be understood that quantities of this compounding product may be stored in stock, and furthermore, that any desired quantities of the final product may be made by forming the substances set forth in the formula into a homogeneous mass as hereinbefore described.

In producing the first mixture, in place of gilsonite, other similar bituminous materials such as grahamite or elaterite may be used, producing equally good results.

There are other substances which may be used in place of the lesser ingredients mentioned to form a combination with the compounding product to produce the desired results. I have merely set forth the combination preferred, and do not contemplate limiting the invention to the particular ingredients named.

I claim as my invention:

1. The process of forming a composite material comprising subjecting a mixture of bituminous material, vulcanized rubber and water to heat, then mixing the product with rubber and vulcanizing the final mixture.

2. The process of forming a material by heating a mixture of gilsonite, vulcanized rubber and water to a temperature substantially above 100° C. in a closed vessel, then drying the product and mixing the same with rubber, sulfur, magnesium oxid, red oxid of iron, impregnated disintegrated cotton fabric, and petrolatum, in substantially the proportions specified to form a second mixture which is subjected to heat to form a homogeneous mass.

3. The process of forming a composite material by subjecting a mixture of gilsonite, vulcanized rubber and water to heat to form a homogeneous mass.

4. The process of forming a material by subjecting a mixture of a bituminous material, vulcanized rubber, and water, to heat, to form a mass which is dried and then mixed with virgin rubber, sulfur, magnesium oxid, red oxid of iron, impregnated disintegrated cotton fabric, and petrolatum, to form a second mixture which is subjected to sufficient heat to form a homogenous mass of the material adapted to be milled into form for use.

5. The process of forming a material for use in place of leather and rubber compositions by mixing 76% of a mixture of gilsonite, ground rubber, and water, which mixture is first subjected to steam under approximately 65 pounds pressure and dried, thoroughly mixing therewith 6% virgin rubber, 4% sulfur, 1% magnesium oxid, 7% red oxid of iron, 4% disintegrated cotton fabric impregnated with unvulcanized rubber, and 2% petrolatum, subjecting the mixture to heat to form a homogeneous mass of the material adapted to be milled into stock form for use.

6. The process of forming a dark, firm substance by mixing substantially equal parts of gilsonite and ground vulcanized rubber, and adding a quantity of water thereto to form a paste which is subjected to steam under approximately 65 pounds pressure and then dried.

7. A material for use in place of rubber compounds comprising a mixture of gilsonite, ground rubber, water, virgin rubber, sulfur, magnesium oxid, red oxid of iron, impregnated cotton fabric, and petrolatum in substantially the proportions specified.

8. The process of forming a composite material by mixing substantially equal parts of asphaltic material and ground vulcanized rubber and then adding water thereto to thoroughly saturate the same, after which the mixture is subjected to the action of steam at a pressure of about sixty five pounds for approximately two hours.

9. The process of forming a material for use in place of leather and rubber compounds by mixing thoroughly and subjecting to heat to form into a homogeneous mass 76% of the product obtained by subjecting equal parts of gilsonite and ground rubber and a quantity of water equal in weight to about half that of the gilsonite and rubber mixture to the action of steam at a pressure of about sixty-five pounds for approximately two hours, 6% virgin rubber, 4% sulfur, 1% magnesium oxid, 7% red oxid of iron, 4% disintegrated cotton fabric impregnated with unvulcanized rubber, and 2% petrolatum.

10. The process of forming a dark firm substance by mixing substantially equal parts of gilsonite and ground vulcanized rubber, and adding a quantity of water equal in weight to about half the combined weight of the gilsonite and rubber to form a paste which is subjected to steam under approximately 65 pounds pressure and then dried.

11. The process of forming a composition by mixing equal parts by weight of gilsonite, ground vulcanized rubber and water and subjecting the mixture to the action of steam at a pressure of substantially sixty five pounds for approximately two hours.

12. The process of forming a flexible composition by mixing thoroughly and subjecting to heat to form a homogeneous mass an intimate mixture of raw rubber, sulfur, an inorganic filler, fibrous material, petrolatum and the product obtained by devulcanizing an intimate mixture of vulcanized rubber and an asphaltic material.

13. The process of forming a composite material which includes mixing an asphaltic material and vulcanized rubber and devulcanizing the mixture so formed.

14. The process of forming a flexible composition by mixing thoroughly and subjecting to heat to form a homogeneous mass, raw rubber, sulfur, an oxid of a metal, fibrous material, petrolatum and the product obtained by devulcanizing an intimate mixture of vulcanized rubber and an asphaltic material.

15. The process of forming a composition consisting in subjecting an intimate mixture of asphaltic material, vulcanized rubber and water to a temperature substantially above 100° C. in a closed vessel.

16. The process of forming a flexible composition by mixing thoroughly raw rubber, a vulcanizing agent, a vulcanizing accelerator, fibrous material, petrolatum, and the product obtained by devulcanizing an intimate mixture of vulcanized rubber and gilsonite and then vulcanizing the mixture so formed.

17. The process of forming a flexible composition by mixing thoroughly raw rubber, a vulcanizing agent, an oxid of a metal, fibrous material, petrolatum, and the product obtained by devulcanizing an intimate mixture of vulcanized rubber and gilsonite and then vulcanizing the mixture so formed.

In testimony whereof I have hereunto subscribed my name in the presence of two subscribing witnesses:

JAMES C. BURDETTE.

Witnesses:
LAWRENCE REIBSTEIN,
EARL M. HARDINE.